(12) United States Patent
Curet et al.

(10) Patent No.: US 6,823,010 B1
(45) Date of Patent: Nov. 23, 2004

(54) METHOD FOR SWITCHING A FIRST DIGITAL AUDIO-VISUAL PROGRAM VIDEO COMPONENT(S) ON A SECOND DIGITAL AUDIO-VISUAL PROGRAM VIDEO COMPONENT(S)

(75) Inventors: Dominique Curet, Thorigne Fouillard (FR); Michel Veillard, Bruz (FR); Germain Lolivier, Rennes (FR); Therese Garault, Saint-Jacques de la Lande (FR); Gerard Hellegouarch, Cesson-Sevigne (FR); Andre Douteau, Chavagne (FR); Stephanie Relier, Rennes (FR); Gerard Madec, Chasne-sur-Ilet (FR)

(73) Assignees: France Telecom SA, Paris (FR); Telediffusion de France SA, Paris (FR)

( * ) Notice: Subject to any disclaimer, the term of this patent is extended or adjusted under 35 U.S.C. 154(b) by 0 days.

(21) Appl. No.: 09/807,621
(22) PCT Filed: Oct. 14, 1999
(86) PCT No.: PCT/FR99/02502
§ 371 (c)(1),
(2), (4) Date: Aug. 13, 2001
(87) PCT Pub. No.: WO00/22829
PCT Pub. Date: Apr. 20, 2000

(30) Foreign Application Priority Data
Oct. 14, 1998 (FR) .......................................... 98 12974

(51) Int. Cl.⁷ ............................................ H04B 1/66
(52) U.S. Cl. ..................... 375/240.12; 375/240.15; 375/240.16; 375/240.26; 348/705; 348/512; 370/487; 370/490; 370/498; 382/232; 382/238

(58) Field of Search ................. 375/240.12, 240.15, 375/240.26, 240.16; 348/705, 512; 382/232, 238; 370/487, 490, 498

(56) References Cited

U.S. PATENT DOCUMENTS

| 5,912,709 A | * | 6/1999 | Takahashi ............... 375/240.15 |
| 5,917,830 A | * | 6/1999 | Chen et al. ................. 370/487 |
| 6,104,441 A | * | 8/2000 | Wee et al. ............. 375/240.15 |
| 6,393,057 B1 | * | 5/2002 | Thoreau et al. ............. 375/240 |
| 6,611,624 B1 | * | 8/2003 | Zhang et al. ............... 382/232 |

FOREIGN PATENT DOCUMENTS

WO 98 32281 A 7/1998

OTHER PUBLICATIONS

J. Mitchell; "MPEG video compression standard"; 1996, Chapmann & Hall XP002098501, p. 355, paragraph 3.

* cited by examiner

Primary Examiner—Shawn S. An
(74) Attorney, Agent, or Firm—Lowe Hauptman Gilman & Berner, LLP

(57) ABSTRACT

First digital audio-visual program video component(s) are switched on a second digital audio-visual program video component(s) by switching on the beginning of the first set of images including an Intra-coded picture of the second program video component encountered after the switching command. In the transmission order of images, each bidirectionally predictive-coded picture of the first set of images referring to the set of images pertaining to the set of images preceding it before switching, is substituted for a bidirectionally predictive-coded picture of the video coding which is produced independently of (1) the substituted image content and (2) the contents of the images to which it refers.

13 Claims, 8 Drawing Sheets

Figure 1:
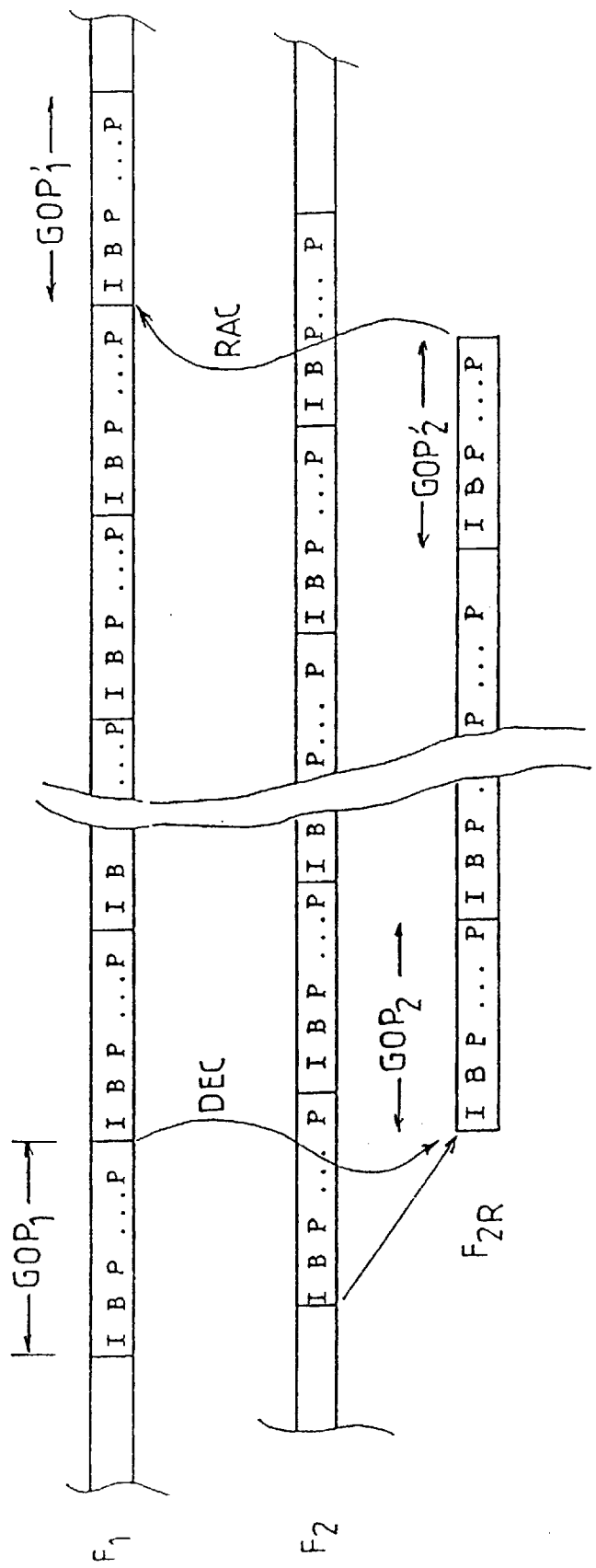

METHOD FOR SWITCHING A FIRST DIGITAL AUDIO-VISUAL PROGRAM VIDEO COMPONENT(S) ON A SECOND DIGITAL AUDIO-VISUAL PROGRAM VIDEO COMPONENT(S)

The present invention relates to a method switching the video component(s) of a first digital, audio-visual program onto the video component(s) of a second digital, audio-visual program.

The invention applies to the field of digital, audio-visual services wherein digital programs consist of at least one video component and may comprise several video components, none or several audio components, and none or several data components. The invention relates only to the video components.

Pertinent digital audio-visual services include those using the so-called MPEG-2 standard (Moving Pictures Expert Group) ISO/IEC JTC1 IS 13818. This standard is described in several documents each corresponding to a distinct portion (video, audio, system, conformity etc.)

Nevertheless it is to be understood that the present invention is not restricted to solely following this particular MPEG-2 standard but also covers any digital, audio-visual service application.

Three kinds of pictures are defined generally, and in particular in the video portion of the MPEG-2 standard:

The so-called I images (Intra-coded pictures] that do not refer to any other picture; these are moderate compression-ratio pictures; their coding does not imply using methods of motion estimates, The so-called P pictures (predictive code pictures) which are coded by using prediction methods estimating motion that are based on a preceding picture which may be a type I picture or a type P picture, The so-called B pictures (bidirectionally predictive-coded pictures) which are coded using motion prediction methods based on a preceding picture (called back prediction for displays) which then are I or P type.

In general the video components discussed in the present invention therefore consist of an ordered string of Intra, predictive- or bidirectional pictures of which the order varies depending on involving the order of presentation or the order of transmission.

One illustrative application of a method of the present invention concerns chaining different TV programs. It involves switching from a first program selected from a given number of a first multiplex' programs to a second program selected from a given number of a second multiplex' programs and possibly, later, in switching again from the second program to the first.

In other words, a first program is disconnected in order to connect to second program, and back. These operations entail two multiplexes of the same syntax which are coded in real time or are retrieved from a storage system.

This application incurs a difficulty which shall now be described in relation to FIGS. 1 and 2 and within the narrower scope of a system adhering to the MPEG-2 standard. Before that, however, said standard will be elucidated.

The audio and video portions of the MPEG-2 standard describe how to digitally code the video and audio data. According to the system part of the MPEG-2 standard, the resultant compressed elementary streams are transformed into elementary stream packets PES (Packetized Elementary Streams). The PES packets containing video data may be of constant or variable sizes. The illustrative embodiment described below relates to using PES video packets of variable size, each PES packet comprising a single picture (possibly with sequence headers or picture groups GOP headers), the pictures being aligned at the beginning of the PES packet. The PES packets moving in the same elementary stream are identified by the same identifier called Stream ID.

The system standard MPEG-2 also specifies that the PES packets (video, audio or data) may be multiplexed for local use for instance with PES signaling packets. Such a multiplex may be stored on disk such as those known as DVD (Digital Versatile Disk), for instance it relates to the program of MPEG-2 syntax.

According to the system MPEG-2 standard, the elementary stream formed into PES packets may then be segmented into fixed-size packets called transport packets (TP). Such a fixed-size packet is identified by a packet identifier (PID). A stream of PES packets having the same Stream ID can only move in transport packets with the same packet identifier PID. The transport packets moving a particular elementary stream (and the PES packets having for the first time segmented this elementary stream) may be multiplexed with other TP transport packets moving other elementary streams, not excluding however TP transport packets containing signaling information etc. The TP transport multiplexes then will be suitable for transmission and their organization then will be determined by the transport MPEG-2 syntax.

The video MPEG-2 standard calls provides six hierarchical levels for the syntax of a video elementary stream: the sequence, the so-called group of pictures (GOP) which is the only optional level, the picture (type I, P or B), the image slice, the macro block and the block.

A video sequence begins with a sequence header which is followed by one or more sets of pictures. According to MPEG-2, these sets of pictures may be combined into groups of pictures GOP. One group of pictures GOP is characterized by a header of a group of pictures GOP situated ahead of the pictures. In the order of transmission, the group of pictures GOP begins with an I picture followed by a given number of bidirectional pictures B and predictive pictures P, and this in a rigorous order. A group of pictures GOP is said to be open when its first pictures B refer to the last picture P of the preceding set or to the group of pictures GOP; it is called closed when there is no such reference. The invention is appropriate for the video elementary streams codes as an open group of pictures GOP.

In general the program video components consists of strings of sequences with one group of pictures GOP per sequence. In a stretch of terminology, any group of pictures GOP shall be called hereafter such a group which is preceded by a sequence header.

Each picture comprises a header and data consisting of a number of slices. A slice pools several continuous macro-blocks in the picture. In conventional digital television (format 4; 2; 0), one micro-block is the combination of four luminance blocks, one block of a first chrominance component for the same pixels and one block of a second chrominance component also for the same pixels. Illustratively one block contains the data of eight by eight pixel squares.

The illustrative implementation of the invention described below is situated at the level of the MPEG-2 transport portion, however the operations carried out at the elementary level and at the level of the PES packets are directly applicable to the MPEG-2 program standard.

Even if all precautions have been taken to terminate the first video component at the sequence end (and at the end of group of pictures GOP) and to start the second video component at the beginning of the sequence (and hence at the beginning of the group of images GOP), there is a major problem when switching a first digital, audio-visual program of conventional television onto a second one, namely the degradation of the resultant picture. It is known that this degradation takes place when the coding of the first pictures B refers to the last picture P or I of the preceding sequence. If the concept of group of pictures GOP is used, this coding is called "coding in open group of images GOP": the appearance of a mosaic in the restored picture is caused by the rupture of the rear reference of the first bidirectional pictures B of each new group of pictures.

Be it borne in mind that each program may comprise several video components, for instance components which are of different views in the program (for instance from several cameras). The invention does apply to each of these components; however, for the sake of clarity, only one video component shall be discussed for each program.

Be it also noted that FIG. 1 is free of the PES packet and transport packet levels. This FIG. 1 represents an elementary video stream F1 of a first program and an elementary video stream F2 of a second program. Each stream F1, F2 consists of a string of groups of pictures GOP comprising pictures I, B and P in the order of transmission. The sequence headers are omitted even though each group of pictures GOP beginning with a picture 1 does comprise one. The headers of the groups of images GOP are also omitted.

The disconnection illustrated by the arrow DEC takes place at the end of a group of pictures GOP1 of the first program and at the beginning of a group of pictures GOP2 of the second program. Be it borne in mind that if the second multiplex is in registration, no problem shall arise to start at a group of pictures of the second program at the end of a group of picture of the first program. On the other hand and as is the case in FIG. 1, if the second multiplex is transmitted in real time, disconnection may require retarding the second program in order to constitute a delayed elementary video stream F2s. For that purpose it may be necessary to employ a buffer memory to store a set of pictures (and its packaging into PES packets and where called for into transport packets) of the elementary video stream of the second program. Frequently the delay introduced by said memory will be undesirable. However the means to avoid it are not considered in this invention.

Similarly reconnection denoted by the arrow RAC takes place at the end of a group of pictures GOP2' of the elementary video stream of the second program to start again on a group of images GOP1' of the elementary video stream of the first program. For that purpose and as was done in the disconnection case, a delay may be introduced in the elementary video stream of the first program. Consequently a buffer memory would be needed to store a group of pictures of the elementary video stream of the first program or using the same means as in disconnection to allow adding the delay caused by this memory.

The major problem introduced by the disconnection or reconnection of digital audio-visual programs in conventional television, and in general by any switching of a first digital audio-visual program onto a second one, is the degradation of the resultant picture. It is known that this degradation occurs when the group-of-picture coding is an open group of pictures GOP wherein the first bidirectional pictures B refer to the last predictive picture P or picture I of the preceding group of images GOP.

Furthermore this type of coding is being used increasingly because, for the sake of good compression, the commercial coders do not as a rule make use of closed groups-of-pictures coding.

The MPEG-2 standard allows denoting in the optional header of any group of pictures GOP that the first bidirectional picture(s) B of the group of pictures GOP cannot be appropriately decoded because the reference picture used for prediction no longer is valid. This is the broken-link indicator. On one hand this information only allows correcting the problem if the concept of group of pictures GOP is used and on the other hand this label is presently useless because in general neither the applications nor the MPEG-2 standard require processing by receivers.

The appearance of a mosaic in the restored picture is caused by the rupture of the rear reference of the first bidirectional pictures B of the new group of pictures (the group GOP2 of the second video elementary stream at disconnection or the group GOP1' of the first video elementary stream at reconnection in FIG. 1).

Figure 2:
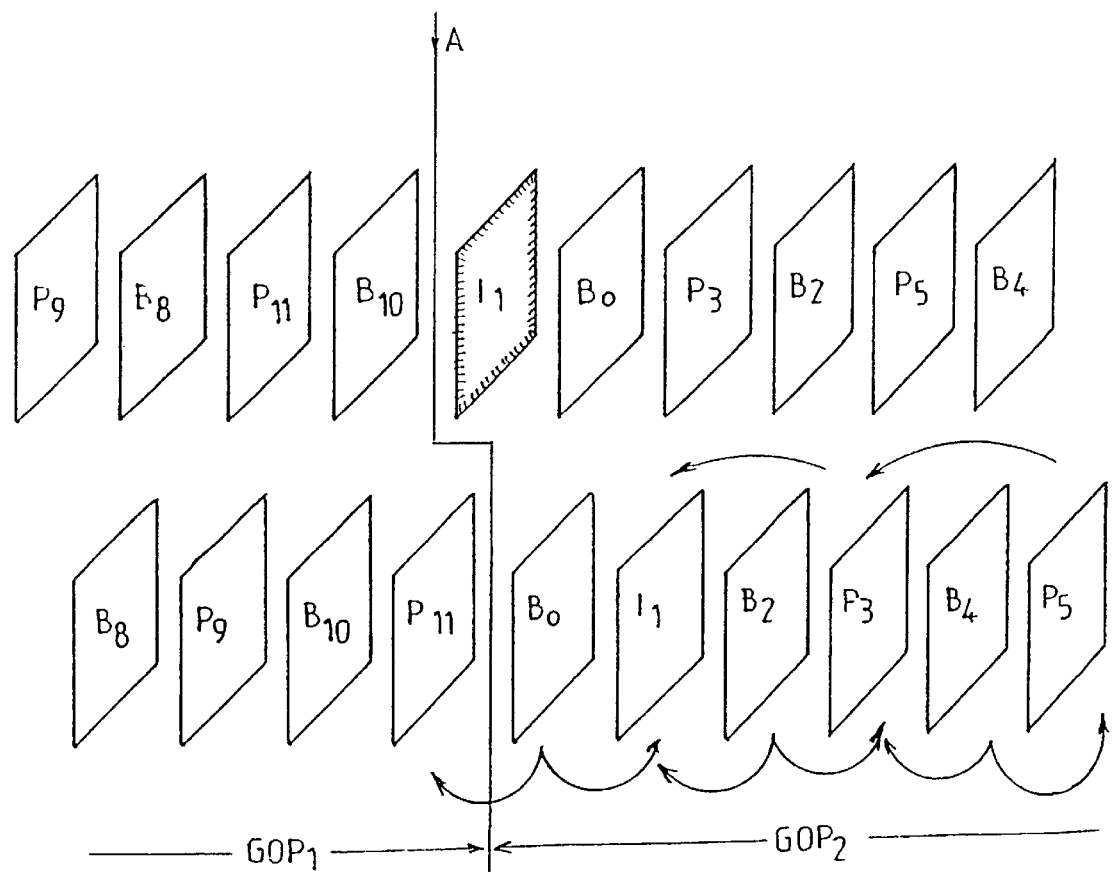

FIG. 2 schematically shows the end of a group of pictures GOP1 of an elementary video stream of a first program and the beginning of a group of pictures GOP2 of an elementary video stream of a second program, the first program being switched onto the second. These groups are shown in the order of transmission of the pictures on the upper line and in the order of display of the pictures after decoding on the lower line. The arrow A represents the time of switching. Moreover FIG. 2 shows by means of arcuate arrows the references from one another or several other pictures. Illustratively the picture B2 refers to both the picture I1 and the picture P3 and this picture P3 refers to the picture I1. The numerals associated with the pictures correspond to their order of presentation (or display).

At the time of coding, the first bidirectional picture B0 of the group of pictures GOP2 exhibits back prediction with a reference on the picture I1 of the group of pictures GOP2 and a forward prediction with a reference on the last picture P11 of the preceding group of pictures GOP1. Following switching, this last reference turns out to be to the last picture P11 of the old group of pictures GOP1 of the first-program video component which does not relate to the same program. Accordingly the back prediction of the first picture B0 is not carried out on the good picture P and this circumstance entails poor decoding of this picture B0. In the embodiment of FIG. 2, this picture B0 shall be composed of references (and hence of parts) of the picture P11 of the old program and of references (and hence of parts) of the first picture I1 of the new program, whereby, on restoration, said "mosaic" materializes.

The objective of the present invention is a switching method applied a video component of a first, digital audio-visual program onto a video component of a second, digital audio-visual program, said method being such that the restoration shall be free of mosaics at the time of switching and that the sole discontinuity exhibited to the user shall be that of program change.

For that purpose a method of the invention to switch the video components of a first, digital audio-visual program onto the video component(s) of a second, digital audio-visual program is characterized in that it switches at the beginning of the first set of pictures comprising an Intra picture of the video component of the second program encountered after the switch command, and, in the order of picture transmission, in replacing each of the bidirectional pictures of this first set of pictures, which refers to pictures belonging to the set of pictures preceding it before switching, with a bidirectional picture of which the video coding is carried out independently of the coding contents of the replaced picture and of the contents of the pictures two which it refers.

In another feature of the invention, said vectors approximating the motion of the replacement picture, or each one, are set to a zero value.

In another feature of the invention, said replacement picture(s) relate uniquely to the Intra picture of the first set of pictures of the second-program video component encountered following the switch command. Said replacement picture(s) advantageous are frame pictures similar to digital television pictures and thus comprise a TOP and a BOTTOM frame and their predictions are field based predictions. The TOP frame and the BOTTOM frame of the replacement picture, or of each of them, then refer to the single TOP frame of the first Intra picture of the set of pictures of the second-program video component.

In another feature of the invention, said replacement picture or each of them refers uniquely to the last predicted picture or Intra picture preceding the switching of the second-program video component, as may be the case when the sets of pictures of the first and second are joined. In this case too the said replacement picture(s) advantageously shall be frame pictures comprising a TOP frame and a BOTTOM frame similar to digital television pictures and their predictions are field based type predictions. The TOP frame and the BOTTOM frame of the replacement picture, or of each of them, then shall refer to the single BOTTOM frame of the last predicted or Intra picture of the last set of components of the first-program video component.

Said pictures of each of said sets of pictures from the first and second programs are respectively carried by PES (packetized elementary streams) packets, each PES packet comprising a single picture and beginning with a video access unit (pictures' beginning, beginning of sequences or of sets of pictures). In the invention, said method consists in:

determining the first PES packet of the second-program video component which is present following the switch command in the stream of PES packets and which comprises a sequence header in order to determine the beginning of the pictures of the second program to which the switching is applied, beginning with this PES packet, a position is assumed on the first bidirectional picture B of this first set of pictures of the second program, replacing the payload data with the replacement picture data in the above PES packet corresponding to a B-picture beginning, once all the data of the replacement picture have been inserted, replacing the data of the payload of this PES packet with video stuffing such as "0" figures until reaching the last data octet of the PES packet, if the number of bidirectional pictures preceding the first predicted picture in said set of pictures is larger than 1, repeating the two above stages for the ensuing pictures B, namely beginning with the next PES packet of this video component.

Said pictures of each of said sets of pictures from the first and second programs illustratively also may be moved by streams of transport packets, each transport packet being fitted with an PUSI indicator which when set at 1 denotes that said packet contains the beginning of a PES packet containing a single picture and beginning with a video access unit, where certain transport packets shall bear transport information such as a random access indicator RAI which, when set at 1, denotes that the next transport packet contains the first data of a sequence (and of a set of pictures). Said method then is characterized by consisting in:

determining the first transport packet TP of the second-program video component which is present following the switch command in the transport stream that comprises a random access indicator RAI set at 1 in order to determine the beginning of the first set of picture of the second program on which the switching is operative, setting at 1 the discontinuity indicator for the adaptation field AF of this transport packet TP, starting with this transport packet TP with random access indicator RAI and including this packet, moving into position on the first picture B of this first set of pictures of the second program, starting with this transport packet TP corresponding to a bidirectional-image B beginning and including this packet, skipping the header of the PES packet and then replacing the data of the payload of each transport packet of the video component with the data of the replacement pictures, after all the data of the replacement picture have been inserted, replacing video stuffing such as numbers 0 for the data of the payload of the transport packet TP of the component with video stuffing such as "0" figures until the next transport packet TP of this second-program video component of which the PUSI indicator is set at 1, excluding this transport packet TP, thereupon, if the number of bidirectional pictures preceding the said first picture is larger than 1, repeating the two above stages for the ensuing bidirectional pictures B, that is beginning with the next transport packet of which the PUSI indicator is set at 1.

Said pictures of each of said sets of pictures constituting the video components of the first and second programs also may be moved by transport packet streams, each transport packet being fitted with a PUSI indicator which when set at 1 denotes that said packet contains the beginning of a PES packet containing a single picture, but where the second stream lacking random access indices RAI. Said method of the invention is then characterized by consisting in:

after the switch command, determining the first transport packet TP of the second-program video component which is present in the stream transport and fitted with a PUSI indicator set at 1 and of which payload data begin with a video sequence header, where called for followed by a group of pictures GOP header, searching for the sequence header either, if present, immediately following the PES packet header or, if the video component is scrambled, by unscrambling, if the ascertained TP packet comprises an adaptation field AF with program clock reference PCR and in the case that the component carries the program clock, setting the discontinuity indicator in this transport packet TP, starting from this transport packet TP (included), move into position on the first bidirectional picture B of this first set of pictures of the second program, starting form this transport packet TP corresponding to a beginning of a picture B included, move past the PES packet or replace this PES header situated at the beginning of the payload with a reconstructed PES packet header and then replacing the payload data of each transport packet TP of the video component with the data of the bidirectional replacement picture B, and if the transport packets TP are scrambled, denoting them in clear by setting the transport scrambling control TSC at the binary value 00, after all picture replacement data have been inserted, replacing the data of the payload if the ensuing transport packets TP of the component with video stuffing such as 00 octets while continuing in denoting them in clear until the next transport packet TP of this second-program video component of which the PUSI indicator is set at 1 (this transport packet TP excluded), then if the number of B pictures preceding the first picture P is larger than 1, repeating the two above stages for the following B pictures, that is starting with the next transport packet TP of which the PUSI indicator is set at 1.

In another feature of the invention, the inserted transport packet TP exhibits the following features:

the PUSI indicator is set at 0, the status of the continuity counter is set at that of the preceding transport packet TP continuity counter of the video component, the adaptation field control AFC is set at the binary value 11 denoting that an adaptation field AF and a payload are present in this transport packet TP, the discontinuity indicator situated in the AF shall be set at 1 if the video component carries the program clock, move a program clock reference PCR computed according to the preceding PCR(s) of the same component into the AF.

In one embodiment variation including pre-processing to allow setting the RAI's provides the following features of the inserted transport packet TP:

the PUSI indicator is set at 1, the status of the continuity counter is set at that of the preceding transport packet TP continuity counter of the video component, the adaptation field control AFC is set at the binary value 11 denoting that an adaptation the random access indicator RAI situated in the adaptation field AF is set at 1, if the video component carries the program clock, a program clock reference PCR calculated from the preceding PCR of the same component shall be moved into the adaptation field AF, the PES packet header that was in the replaced transport packet TP is moved into the payload of this inserted transport packet TP and in case the presentation stamp PTS is absent from the PES packet header, said PTS shall be computed and moved into the PES packet header data.

In another feature of the invention, the reconstructed PES packet header assumes the following form: start code= 0x000001; stream ID=that of the first packet; PES packet length=0x0000, 0x000001; flag octet=0x8500; length of the header data=0x00; PES packet in clear; no PTS/DTS nor any other PES packet header data.

In another feature of the invention, if the ascertained transport packet TP does not contain an adaptation field AF or if it involves the component including the program clock and the adaptation field AF lacks a program clock reference PCR, said method consists in replacing the particular transport packet TP by a transport packet TP bearing a program clock reference PCR and in shifting the replaced transport packet TP as well as the following transport packets TP of this video component in the transport stream until one of them can be inserted into a stuffing transport packet TP.

In another feature of the invention, the switching procedure consists in switching at the beginning of the first set of pictures of the second program encountered after the switch command, which may take place at any picture of the current set of pictures of the first program. In order to circumvent regulation problems relating to the decoder's buffer memory, the method of the invention advantageously replaces the transport packets containing each picture of the second program's first set(s) of pictures encountered after the switch command with an equal number of transport packets containing a supercompressed corresponding picture and stuffing data.

This method can be implemented when a main program (for instance a nationwide program) is decoupled toward a secondary program (for instance a local one).

In another feature of the invention, the switching procedure consists in interrupting the first program at the beginning of a predictive picture following the switch command, in inserting a predetermined-content picture pattern, then in switching at the beginning of the first set of pictures of the second program encountered after the switch command. As above, in order to circumvent regulation problems attending the decoder buffer memory, the method of the invention advantageously consists in replacing the transport packets containing each picture of the last set(s) of pictures of the first program encountered after the switch command with an equal number of transport packets containing a supercompressed corresponding picture and stuffing data.

This procedure may be implemented when reconnecting a secondary program such as a local program onto a main program such as nationwide one.

The above cited features of the invention as well as others are elucidated in the description below of an illustrative embodiment and in relation to the attached drawings.

Figure 3:
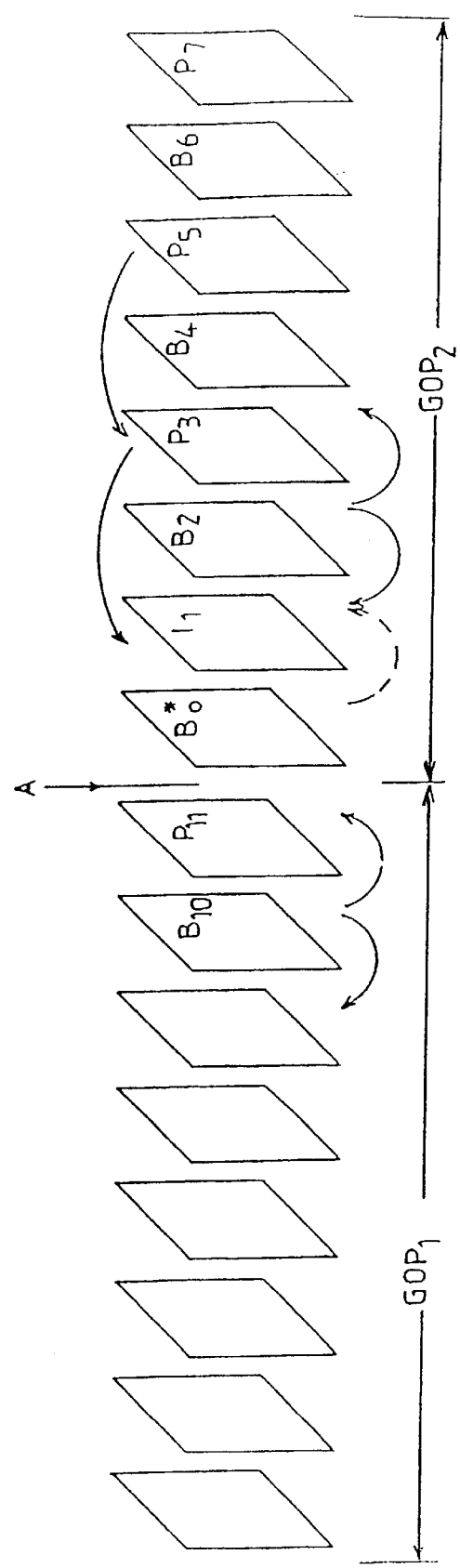
Figure 4:
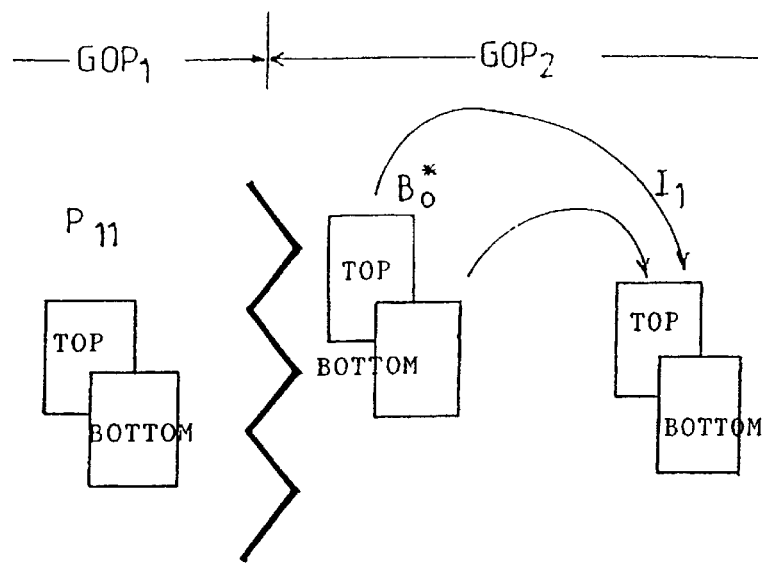
Figure 5:
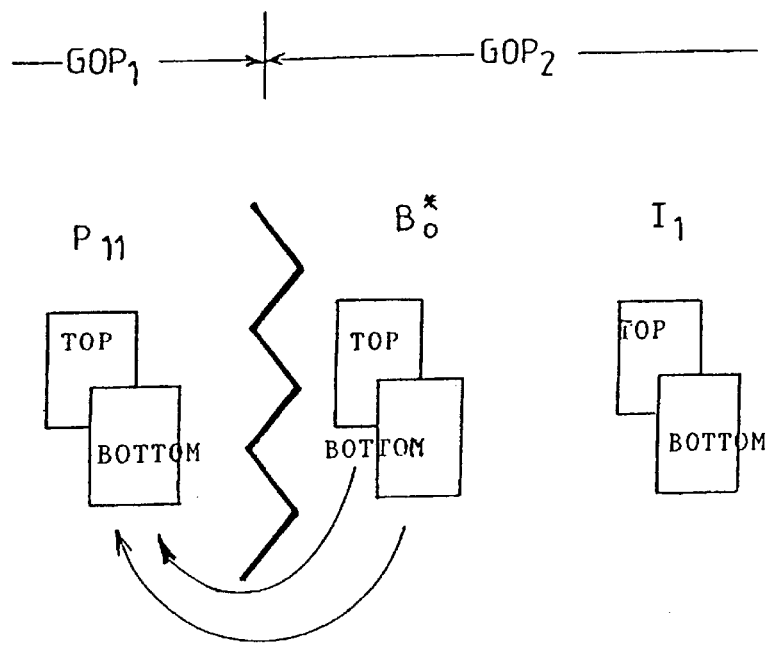
Figure 6:
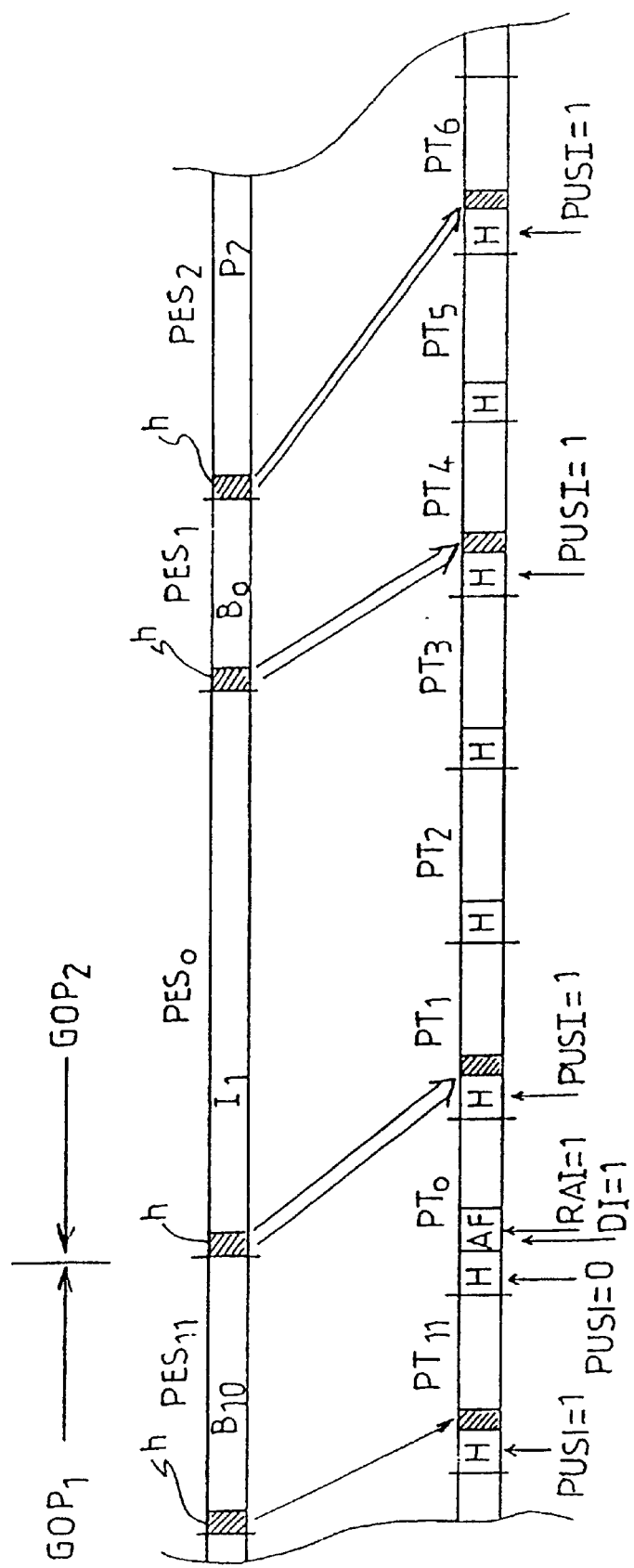
Figure 7A:
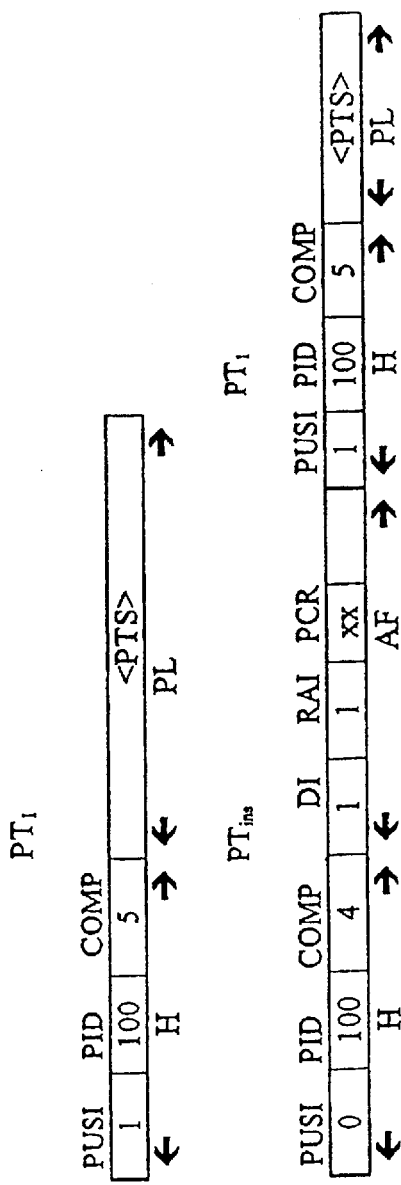
Figure 7B:
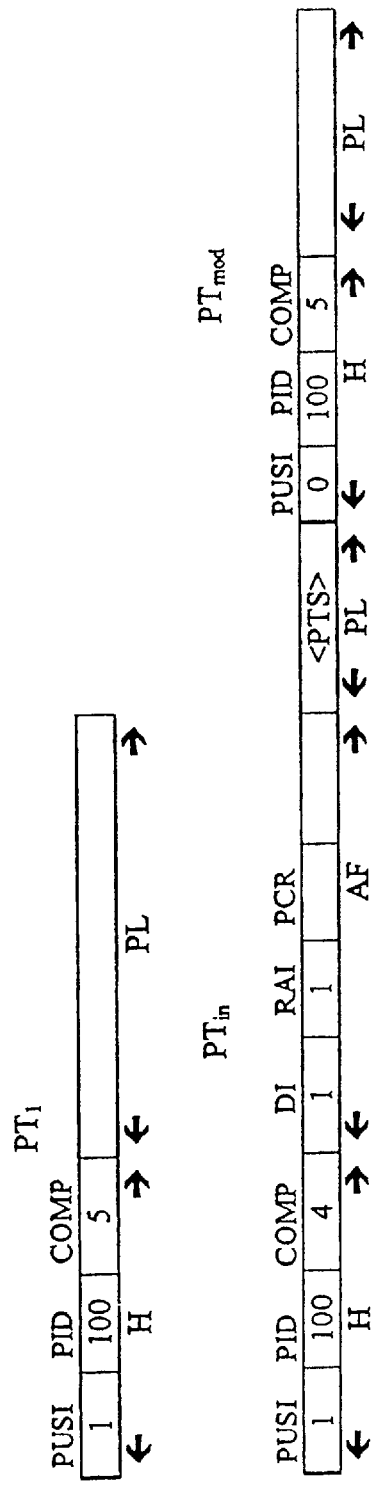
Figure 8:
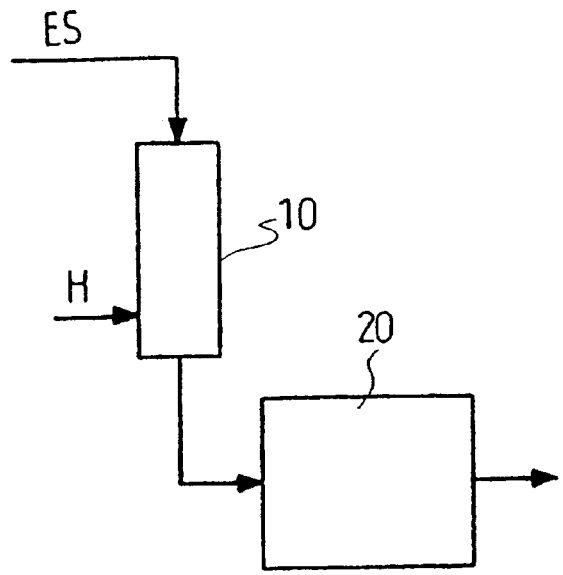
Figure 9:
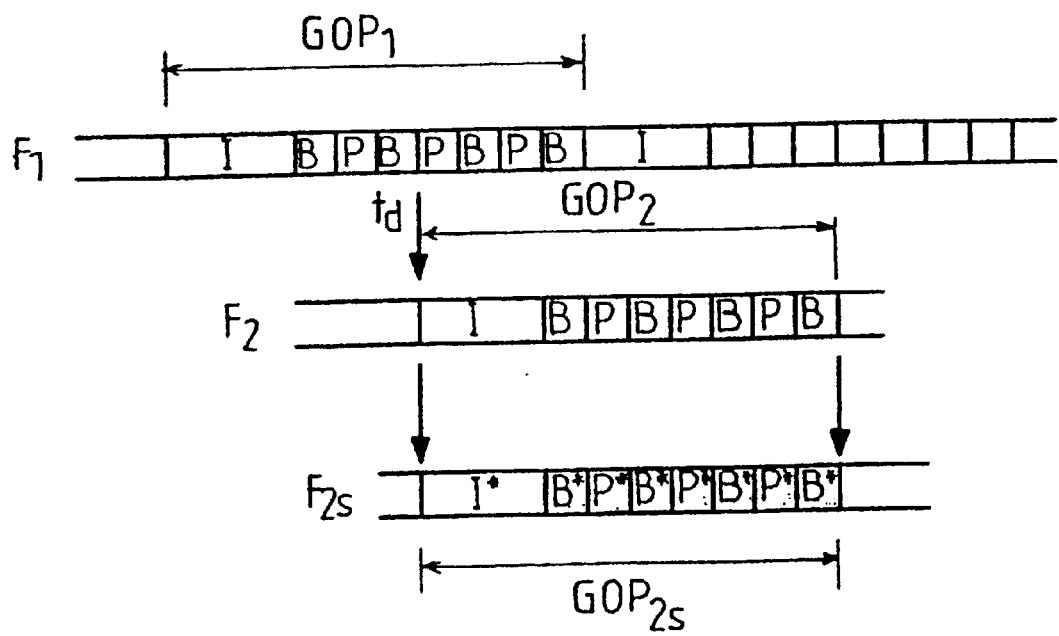
Figure 10:
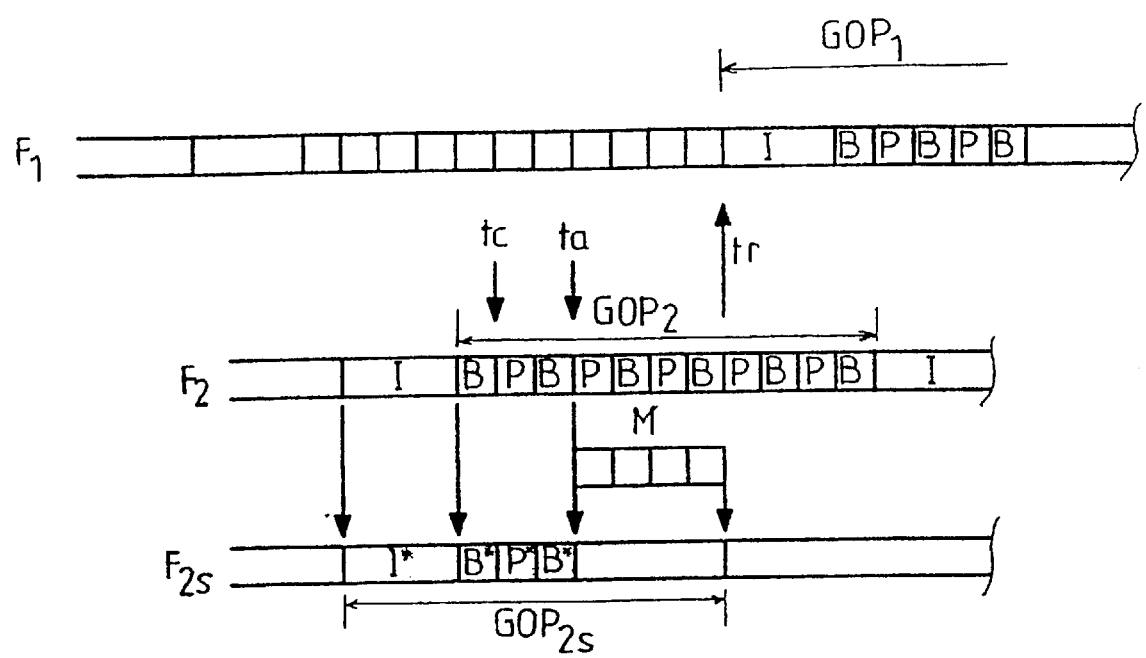

FIG. 1 is a view illustrating the switching operations (disconnection and reconnection) applied to elementary video streams, FIG. 2 illustrates the prediction problem and shows improper indexing of the first picture B of the video elementary stream of the new program, FIG. 3 illustrates the method of the invention, FIG. 4 illustrates a first implementation of a method of the invention, FIG. 5 illustrates a second implementation of the method of the invention, FIG. 6 illustrates switching near the PES packets, at its upper part, and near the transport packets at its lower part, FIGS. 7a, 7b illustrate the format of the TP packets inserted as needed in disconnection and reconnection, FIG. 8 is a simplified diagram of a decoder fitted with a buffer memory, FIG. 9 illustrates switching or disconnecting a first program toward a second program while using supercompression, and FIG. 10 illustrates switching or reconnecting a first program relative to a second program while using supercompression.

The illustrative embodiment described below relates essentially to the MPEG-2 standard. But it is understood that the present invention is not limited to that standard.

In the following description of an illustrative embodiment of the invention, the structure of the group of pictures GOP of the two video streams under consideration—and which is characterized by the gap between two pictures P (called parameter M) and the gap between two pictures (called parameter N)—is such that M=2, denoting that a single bidirectional picture B is situated between two consecutive predicted pictures P. The value of the parameter N is arbitrary, the number of pictures in a group of pictures GOP not affecting the invention.

FIG. 3 shows two groups of pictures, namely the last group of pictures GOP1 of the video component of a first program and the first group of pictures GOP2 of the video component of a second program.

Be it noted that each program may comprise several video components, for instance components corresponding to different fields of view of this program (for instance several cameras).

In FIG. 3, an arrow A denotes the time at which the first program was switched onto the second. Inside each group of pictures, a series of pictures I, B and P is shown and numbered in their order of display by a decoder. Arcuate arrows show the links between the different pictures.

In the invention, the first picture(s) B of the new group of pictures GOP2 are replaced by a picture B*, denoted B*0 herein, of which the video coding is carried out independently of the contents of the coding of the replaced picture and of the picture contents to which it refers.

Be it noted that the pictures under consideration may be conventional digital television interleaved pictures. Accordingly each picture consists of two frames, namely a TOP frame and a BOTTOM frame. The macroblock prediction of these two frames may be a joint one, ie. frame based, or it may be separate, i.e. field based. In order to preserve perfect registration and to avert the impression of going "backward", the prediction must be separate, i.e. field based, for each frame.

FIG. 4 illustrates a first application of the invention. Its principle is to discontinue the forward reference toward the last picture P of the GOP1 and to freeze the picture I1 of the group of pictures GOP2 instead of displaying the improper picture B. For that purpose the prediction of the replacement picture B* takes place solely at the picture I1 (back prediction) and its motion estimating vectors are zero.

To preclude a backgoing impression, the two frames of the replacement picture B* must preserve only the lower frame of the picture I1. For that purpose the upper TOP frame and the lower BOTTOM frame of the replacement picture B*0 refer (back prediction) to the sole upper TOP frame of the picture I1 of the group of images GOP2 of the second program after switching takes place. Be it borne in mind that this is possible only by the prediction-per-frame mode. Therefore this replacement pattern allows preserving the upper frame of the picture I1, of the group of pictures GOP2 of the second program following switching. The upper TOP frame of picture I1 in this manner shall be presented three times for restoration: a first time on the TOP frame of the picture B, a second time on the BOTTOM frame of the picture B, and a third time on the TOP frame of the picture I. The displayed picture B suffers a slight loss in vertical resolution on account of the shift of one line of the frame which repeats.

FIG. 5 illustrates a second implementation of the invention. Its principle is to disconnect the backward reference toward the picture I1 of the group of pictures GOP2 and to freeze the last picture P11 of the group of pictures GOP1 instead of displaying the improper picture B0. For that purpose the prediction of the replacement picture is carried out solely on the picture P11 (forward prediction) and its motion estimating vectors are zero.

To avoid an impression of going back, the two frames of the replacement picture B* must preserve only the lower frame of the picture P11. Accordingly the upper TOP frame and the lower BOTTOM frame of the replacement picture B*0 refer (forward prediction) to the sole lower frame (termed BOTTOM frame) of the picture P11 of the group of pictures GOP1 of the first program. Be it noted that here too this is only made possible by the prediction per frame. Thus said replacement pattern allows preserving the lower frame of the last picture P of the group of pictures GOP1 of the first program preceding switching. The lower BOTTOM frame of the last picture P therefore will be presented three times for restitution: once on the BOTTOM frame of the displayed picture P, a second time on the TOP frame of the picture B and lastly a third time on the BOTTOM frame of the picture B. The displayed picture B is slightly degraded in vertical resolution because of the shift of one line of the frame which repeats itself.

Be it noted that the replacement picture B must be in the same format (resolution, that is horizontal and vertical sizes in particular) as the picture it replaces. Different means may be used to retrieve the size information. for instance it may retrieved from the so-called TARGET BACKGROUND GRID descriptor if it is present in the program map table. It may also be retrieved directly from the elementary video stream data.

Moreover the time reference (order of displayed pictures) of each replacement picture B corresponds to that of the picture it replaces in its group of pictures GOP.

Lastly and in order to meet the MPEG-2 standard, the minimum delay (called VbV delay in the MPEG-2 standard) before a picture can be decoded, once the first picture octet has arrived in the decoder buffer, is defined as follows:

if it is moved into the other pictures of the group of pictures GOP, it must also be moved into the replacement picture: it may be retrieved from the replacement picture, if it is set at 'FFFF in the other pictures of the group of pictures GOP, it also must be set at 'FFFF in the replacement picture.

As already stated, the transport MPEG-2 standard stipulates that the packetized elementary streams PES packets, each containing in their payload the data of one or more pictures (as a rule one), will be segmented into transport packets TP.

Accordingly, as shown in FIG. 6, the upper line shows the stream of PES packets and the lower line shows the stream of the corresponding transport packets. They are shown in the order of transmission. In FIG. 6, only the packets moving the video component of one program are shown, with omission for the sake of clarity of the packets of which the stream identifiers ID (level of PES packets), or of which the packet identifiers PID (level of the transport packets), are different and may interpose themselves.

According to the MPEG-2 standard, each PES packet comprises a header h and a payload. Illustratively and according to what is shown in FIG. 6, the payload contains the data of a single picture. Accordingly the PES packets are aligned (the data alignment indicator is set at 1). For instance the payload of the PES0 packet contains the data of the picture I1 of the new group of pictures GOP2 and the PES1 packet contains the data of the picture B0 of the same group GP2.

Each transport packet comprises a header H and a payload containing a portion of the picture data. By definition the contents of the TP packets are aligned with the beginnings of the PES packets. In general the payload of the packets TP1 through TP3 therefore bear the header h of the PES packet followed by the data of the picture I1, and the payloads of the packets TP4 et TP bear the header h of the PES1 packet followed by the data of the picture B0 of the group of pictures GOP2.

The transport packets of which the payload begins with the header h of a PES packet are fitted with the header PUSI (payload unit start indicator) indicator set at 1. By the PUSI indicator's definition, this is also the case for the packets TP11, TP4 and TP6.

Some packets intended to carry transport data comprise a so-called adaptation field. In this adaptation field AF, a random access indicator RAI indicates, when set at 1 (the case of the transport packet TP0 in FIG. 6) that next transport packet fitted with a PUSI indicator set at 1 (in this case transport packet TP1) contains not only a beginning of PES packet (PES0) but also a beginning of a video sequence (the group of pictures GOP2 in this instance). Be it noted that the transport packet TP with the PUSI indicator set at 1 may be that of which the RAI indicator is set at 1. The adaptation field AF also contains a discontinuity indicator DI which, when set at 1, indicates discontinuity starting with this transport packet TP. This discontinuity applies as well to the continuity counter and the discontinuity of the program clock references PCR if the said component does transport these references.

In general the digital television systems will transmit frequently and regularly (once every 500 ms) sequence headers in order to allow the video decoders to react quickly in case of a rapid program change (zapping) and application of voltage to a receiver.

In this invention, said headers are used to determine the switching positions in order to properly start the second program with initialized video data.

As regards the transport packets, said headers may be flagged by random access indicators RAI.

Nevertheless as regards the transport streams issuing from multiplexers that do not set these RAI indicators, preprocessing is provided to allow inserting them, in the manner described further below.

In order to determine which bidirectional picture(s) shall be replaced (a single picture in the case of the parameter M=2), first the transport packet containing the sequence-beginning and the beginning of picture I1 of the second-program video component at which switching takes place is sought, namely after the switch command.

For that purpose one seeks the transport packet with the adaptation field AF where the random access indicator RAI is set at 1. In FIG. 6, this packet is the packet TP0. A discontinuity index DI is placed in the adaptation field AF of this transport packet TP.

Then the next transport packet TP of this component (i.e. the packet with the random access indicator RAI included) of which the PUSI indicator is set at 1 is sought. In FIG. 6, this packet is the TP1 packet. By the definition of the RAI indicator, this transport packet TP comprises the sequence beginning of the second program followed by the beginning of the first picture of the group of pictures GOP2, that is the picture I1.

The next transport packer—of which the PUSI indicator is set at 1—and in this instance the transport packet TP4, comprises the beginning of the PES packet containing the following picture of the group of pictures GOP, that is the picture B0. This packet TP4 as well as the following packets of this component until the next packet TP of which the PUSI indicator is set at 1 (in FIG. 6, the transport packet TP6), contain the header of the PES packet followed by all the data of the picture B0.

The TP5 packet contains the data regarding the beginning of the next picture, in this instance the first P type picture, namely here the picture P3.

Therefore the replacement of the B picture begins at the transport packet TP4 and shall terminate at the transport packet TP6 (excluded). The payload of the first transport packet TP4—usually containing the header of the PES packet and the beginning of the B0 picture—is replaced by a restored PES packet header and by the first octets of the replacement picture B*. The payload of the other transport packets under consideration is replaced by the following octets of the replacement picture B*. Once the replacement picture B* has been completely inserted into the payload of the transport packets under consideration, the payload octets of the following transport packets are replaced by video stuffing octets ('00) until the next transport packet of this component of which the PUSI indicator is set at 1 (transport packet TP6 excluded).

The header of the PES packet situated at the beginning of the payload of the transport packet TP4 is replaced by a reconstructed header. Illustratively the values assigned to different fields and their usual designations (MPEG-2) are listed below: start code=0x000001; stream ID, PES packet length=0x0000, flag=0x8D, length of data header–0x00, no PTS/DTS stamps nor any other data of the PES packet header. When the stream is in clear, the stream ID shall be preserved. Otherwise, if scrambled, the stream ID must be known from other sources.

The replacement picture B*0 is not scrambled even if the video elementary stream of the second program is. The PES packet moving it therefore is not scrambled (the scrambling control field in the PES packets header has a binary value h=00 denoting that the PES packets are in clear) and so do the transport packets TP moving this PES packet (the transport scrambling control TSC field in the transport packets header has a binary value H=00, denoting that the PES packets are in clear). Be it noted that the entitlement control messages ECM, i.e. validation messages, which contain the cryptograms of the control words continue being emitted but are not used because the transport packets moving the replacement picture are in clear.

In the embodiment of FIG. 6, the parameter M=2: therefore only one picture B is being replaced. In the event the number of pictures shall be larger than 1 after the time of switching, i.e. M>2, the following pictures B of the new group of pictures GOP2 also shall be replaced by a constant picture pattern B*. This picture pattern is the same as for the first picture of the group of pictures GOP2, except for the time reference and any delay VbV. As regards the transport, the beginning of the following picture B is situated on the next transport packet of the component of which the indicator PUSI is set at 1, this transport packet also determining the end of the preceding picture B. Therefore the replacement procedure is the same for all pictures B.

The number of first pictures B which must be replaced must be known. This information is absent from the headers of the group of images GOP or from the sequence headers and also from all descriptors. In case this number is a constant, one solution consists in finding a way to transmit this information in the stream, otherwise only decoding the picture header shall reveal the kind of pictures and to infer from that the number M. This decoding will be simple when the component is in clear, but on the other hand requires a real time unscrambler is the component is scrambled. Such decoding may be carried out during a learning phase preceding switching if M is constant or else at the time of arrival of the pictures of the second program. In the latter case, replacement entails a delay function.

As already discussed above and as regards the application of the invention, the random access indicators RAI are used to determine the switching positions. In case a transport stream is without RAI indicators, a means shall be provided to insert them a few seconds prior to switching.

Pre-processing allowing to set the random access indicators RAI consists in determining a transport packet TP containing an PUSI indicator set at 1 and a beginning of sequence in its payload, and in inserting just prior to this transport packet a new transport packet wherein the RAI indicator is set at 1.

In the system MPEG-2 standard, the RAI indicator is situated in the adaptation field AF. Being set at 1, it indicates that the next transport packet TP of this component which contains a PES packet beginning (and hence a PUSI indicator set at 1) comprises a sequence header in its payload. Moreover all the synchronization information must be present in the transport packet TP together with the random access indicator RAI, in particular a program clock reference PCR if the component carries the program clock and a presentation time stamp PTS in the PES packet header.

FIG. 7a shows an illustrative implementation of processing the setting of the RAI indicator in the event the presentation time stamp PTS is included in the PES packet beginning in the transport packet TP1. The upper line shows a transport packet TP1 of which the PUSI indicator is set at 1 in the header H and of which the payload contains the beginning of a PES packet together with a presentation time stamp PTS followed by a sequence header. The PID identifier of the component is 100 (in this example) and the continuity counter COMP is at the arbitrary value of 5.

The lower line shows the transport packet TPins which is inserted to replace the transport packet TP1 which in turn is shifted. This packet TPins comprises the following features:

the PUSI indicator is set at 0: this transport pocket does not contain a PES packet-beginning, the status of the continuity counter COMP is set at that of the preceding continuity counter of this video component, that is at 5−1=4, the adaptation field control AFC is set at the binary value of 10, denoting that the transport packet contains an adaptation field but not a payload, the RAI indicator is set at 1 in the adaptation field AF, the discontinuity indicator DI is set at 1 in the adaptation field, if the component carries the program clock, a program clock reference PCR shall be moved into the adaptation field and shall be computed by interpolation between the two preceding PCR clock references of the component under consideration or solely on the basis of the preceding PCR clock reference if the system clock of the transport stream is known accurately.

Thereupon the transport packets of the video component shall be shifted until one of them can be moved into a stuffing transport packet (as early as possible).

FIG. 7b shows another illustrative implementation of pre-processing the setting of the RAI indicator in the event the presentation time stamp PTS is absent from the PES packet beginning in the transport packet TP1. The upper line of FIG. 7b shows the transport packet TP1 with its header H and its payload PL.

Be it borne in mind that the MPEG-2 standard requires that a presentation time stamp PTS be present for the first PES packet and hence the first picture that follows the RAI indicator.

The TPins packet inserted to replace the transport TP1 itself modified as TPmod is shown on the lower line. The inserted TPins is characterized as follows:

the PUSI indicator is set t 1: this packet contains the beginning of a PES packet, the status of the continuity counter COMP is set at that of the continuity counter of the preceding transport packet of this video component, i.e. at 5−1=4, the adaptation field control AFC of the adaptation field AF is set at the binary value 11 denoting that the transport packet includes an adaptation field AF and also a payload, in the adaptation field AF, the discontinuity index DI is set at 1, in the adaptation field AF, the RAI indicator is set at 1, a program clock reference PCR is moved into the adaptation field AF if the component carries the program clock, it is calculated by interpolation between the two preceding program clock references PCR of the component being considered or solely according to the preceding program clock reference PCR if the clock system of the transport stream is accurately known, a payload comprising the PES packet header together with presentation time stamp PTS calculated according to the program clock reference PCR of the transport packet and the video buffer verifier VbV delay; as shown above, the video buffer verification VbV delay is the minimum expected delay before the ability to decode a picture once the first picture octet has arrive in the decoder buffer.

The initial packet TP1 is modified: its PUSI indicator is set at 0 and the header of the PES packet is eliminated because the beginning of the PES packet has been moved into the TPins packet: it becomes the TPmod packet. Replacement begins with the TPmod packet. The transport packets of the video component are shifted until one of them can be placed in a stuffing transport packet (as soon as possible)

In the above description, disconnection and reconnection are implemented to within one group of images GOP. Solutions were sought for disconnection and reconnection to withing the accuracy of one picture.

FIG. 8 shows a buffer memory 10 of the FIFO type of which the output is connected to an elementary video stream decoder 20. The buffer memory 10 is fed with an elementary stream ES issuing from a flow of packetized elementary stream ES which in turn issues from a stream of transport packets. Using a signal from a clock H exhibiting a regular period, the buffer memory 10 delivers at each regular time interval (for instance every 40 ms) all the data of a picture which may be of the I, B or P types. The decoder 20 then decodes these picture data delivered by the buffer memory 10 and feeds them to the user for display.

Perforce the capacity of the buffer memory is limited and as shown further below—at the time of disconnection at an accuracy of one picture of an elementary video stream toward another elementary video stream or at the time of reconnection to an accuracy of one picture of an elementary video stream to another elementary video stream—appropriate regulation of the buffer memory may suffer. In that event there shall ensue loss of data and defects in the displayed pictures.

This problem and the present invention's solution are illustrated in FIG. 9 for the case of disconnection a video stream F1 toward a video stream F2. The streams F1 and F2 of FIG. 9 are transport packet streams. This FIG. 9 shows a group of pictures GOP1 of the stream F1 consisting of one picture I followed by sequences of pictures B and P. At a time td, the stream F1 is switched onto the first picture I of the stream F2 for which a group of pictures GOP2 is shown, GOP2 itself consisting of one picture I and a sequence of pictures B and P.

In FIG. 9, the B and P pictures are shown being much smaller than the I pictures, and this is generally the case.

If the elementary stream consisting on one hand of the portion of the group of pictures GOP1 preceding the switching time td and on the other hand of the pictures of the group of pictures GOP2 were to directly feed a buffer memory 10 such as shown in FIG. 8, inconsistency in the stuffing level of this buffer memory 10 might ensue, in particular at the consecutive arrivals of two type I pictures in the buffer memory 10.

To resolve this particular problem, a given number $N \geq 1$ of groups of pictures of the stream F2 constituting the first groups of pictures following switching at time td is super-compressed in a manner to form one or more super-compressed groups of pictures GOP2s (N=1 in FIG. 9).

The video supercompression implemented to attain one or more super-compressed groups of pictures is an algorithm lowering the flow of a video component. In other words, the super-compression procedure used consists in extracting the groups of pictures GOP and the pictures of the elementary stream from the stream of transport packets and PES packets to be compressed. Thereupon the super-compression method is applied to each of these pictures. Each picture which is super-compressed in this manner—and after it is configured into PES packets—is placed into the same transport packets as the initial picture, the packets which do not contain picture data then being stuffed with stuffing data. Advantageously the beginning of every super-compressed picture corresponds to the beginning of the initial corresponding picture.

In FIG. 9 the super-compressed pictures are denoted by an asterisk.

Therefore the method of the invention consists in replacing the transport packets of each picture of the first group(s) of images GOP2 encountered after the switch command at time tc with the same number of transport packets containing a super-compressed corresponding picture and stuffing data.

This reinsertion procedure consists in replacing the transport packets by using the super-compression ratio.

Be it borne in mind that the super-compression procedure can be implemented beforehand using a stored video stream F2 and that its result will be stored in turn. The super-compressed groups of pictures GOPs then are used at the desired time in a disconnection procedure in the direction of the recorded stream F2.

However said super-compression procedure also can be carried out in real time on an incoming stream F2.

The problem outlined above and its solution by the present invention will now be illustrated in relation to FIG. 10 for the case of reconnecting a stream F2 to a stream F1. This FIG. 10 shows a group of pictures GOP1 of a video stream F1 and also a group of pictures GOP2 of a video stream F2. The group of pictures GOP2 is shown as a sequence of pictures I, B and P.

The command to reconnect occurs at time tr. At time ta, the stream F2 is interrupted and a pattern M illustratively consisting of a sequence of predefined pictures B and P is then inset until the time of reconnection tr onto the first picture I of the group of pictures GOP1 of the stream of pictures F1.

At the time of reconnection, the buffer memory 10 may contain groups of pictures GOP1 and GOP2 or portions of them whereby regulation defects may arise.

In order to overcome this regulation problem of the buffer memory 10 by means of an embodiment of the invention, this invention uses, in the transport stream, the prior super-compressed pictures at the disconnection time ta, then the pattern M until the reconnection time tr. The group consisting of the super-compressed pictures and of the pattern M constitutes a super-compressed group of pictures GOP2s comprising the pictures of the group of pictures GOP2 that were super-compressed before the time ta at which the group GOP2 was interrupted, and also the pattern M.

In FIG. 10 the super-compressed pictures are denoted by an asterisk.

In another embodiment variation of the invention, the super-compression is applied to several groups of pictures of the stream F2 preceding the time of attachment tr.

The implemented super-compression procedure is the same as the one described above in relation to FIG. 9.

Be it borne in mind that the above described super-compression procedures can be carried out independently of the replacement procedure of the invention, but that they do introduce synergy because allowing disconnection and reconnection to within one picture.

What is claimed is:

1. A method of switching video component(s) of a first digital audio-visual program onto video component(s) of a second digital audio-visual program, each video component including in the order of presentation of a sequence of ordered sets of pictures which are Intra or predictive or bidirectional, each Intra picture being devoid of reference to any other picture, each predictive picture referring to the Intra picture or to the predictive picture preceding it, each bidirectional picture being referable to two Intra or predictive pictures, namely the Intra picture or the following predictive picture or to a combination of two preceding and following predictive pictures or Intra pictures, the method comprising:

performing switching at the beginning of the first set of pictures including an Intra picture of a video component of the second program encountered following the switch command and in the transmission order of the pictures, replacing each of the bidirectional pictures of the first set of pictures referring to pictures belonging to the set of pictures which preceded it with a replacement picture including a bidirectional picture referring to a previous picture in the transmission order and having its motion vectors set to a zero value, each replacement picture being a frame picture including a top frame and a bottom frame, each of said top and bottom frames referring to the closest frame in the display order of said picture.

2. The method of claim 1, further including switching at the beginning of the first set of pictures of the second program encountered following the switch command, said switch command being applicable to an arbitrary picture of the current set of pictures of the first program.

3. The method of claim 2, further including replacing the transport packets including each picture of the first set(s) of pictures of the second program that were encountered following the switch command with an equal number of transport packets containing a super-compressed corresponding picture and stuffing data.

4. The method of claim 1, further including interrupting the first program at the beginning of a predicted picture following the switch command, inserting a pattern of pictures having a predetermined content, then switching at the beginning of the first set of pictures of the second program that were encountered after the switch command, replacing the transport packets containing each picture of the last set(s) of pictures of the first program preceding switching with an equal number of transport packets containing a super-compressed corresponding picture and stuffing data.

5. The method of claim 1, wherein each of the replacement pictures uniquely refers to the Intra-picture of the first set of pictures of a video component of the second program encountered following the switch command, a video component of said top frame and said bottom frame of each replacement picture referring to the sole frame of said first Intra picture of the set of pictures of the video component of the second program.

6. The method of claim 1, wherein each of the replacement pictures uniquely refers to a reference picture that is either the last predictive picture or the last Intra-picture of the last group of pictures of the video component of the first program, said top frame and said bottom frame of each replacement picture referring to the sole bottom frame of said reference picture.

7. A method of switching video component(s) of a first digital audio-visual program onto video component(s) of a second digital audio-visual program, each video component including in the order of presentation of a sequence of ordered sets of pictures which are Intra or predictive or bidirectional, each Intra picture being devoid of reference to any other picture, each predictive picture referring to the Intra picture or to the predictive picture preceding it, each bidirectional picture being referable to two Intra or predictive pictures, namely the Intra picture or the following predictive picture or to a combination of two preceding and following predictive pictures or Intra pictures, the method comprising:

performing switching at the beginning of the first set of pictures including an Intra picture of the second-program video component encountered following the switch command and in the transmission order of the pictures, replacing each of the bidirectional pictures of this first set of pictures referring to pictures belonging to the set of pictures which preceded it with a bidirectional picture, performing video coding independently of the contents of the replaced picture and of at least one of the contents of the pictures to which it refers, said bidirectional pictures including motion-estimating vectors, and further comprising setting to a zero value said motion-estimating vectors of the replacement picture, or each one, said replacement picture(s) referring uniquely to the Intra picture of the first set of pictures of the second-program video component encountered following the switch command, said pictures of each of said sets of pictures of the first and second programs being respectively carried by packets of elementary streams (PES), each PES packet comprising a single picture and beginning with a video accessing unit;

determining the first PES packet of the second-program video component which is present after the switch command in the stream of PES packets including a sequence header in order to determine the beginning of the first set of pictures of the second program to which the switching is applied;

beginning with this PES packet, moving into position on the first bidirectional picture B of this first set of pictures of the second program;

replacing the payload data with the data of the replacement picture after all the data of the replacement picture have been inserted;

once all the replacement picture data have been inserted, replacing the payload data of this PES packet with video stuffing until the last data octet of the PES packet; and thereupon, if the number of bidirectional pictures preceding the first predicted picture in said set of pictures is larger than 1, repeating the two preceding steps for the following B pictures, starting with the next PES packet from this video component.

8. A method of switching video component(s) of a first digital audio-visual program onto video component(s) of a second digital audio-visual program, each video component including in the order of presentation of a sequence of ordered sets of pictures which are Intra or predictive or bidirectional, each Intra picture being devoid of reference to any other picture, each predictive picture referring to the Intra picture or to the predictive picture preceding it, each bidirectional picture being referable to two Intra or predictive pictures, namely the Intra picture or the following predictive picture or to a combination of two preceding and following predictive pictures or Intra pictures, the method comprising:

performing switching at the beginning of the first set of pictures including an Intra picture of the second-program video component encountered following the switch command and in the transmission order of the pictures, replacing each of the bidirectional pictures of this first set of pictures referring to pictures belonging to the set of pictures which preceded it with a bidirectional picture, performing video coding independently of the contents of the replaced picture and of at least one of the contents of the pictures to which it refers, said bidirectional pictures including motion-estimating vectors, and further comprising setting to a zero value said motion-estimating vectors of the replacement picture, or each one, said replacement picture(s) referring uniquely to the Intra picture of the first set of pictures of the second-program video component encountered following the switch command, said pictures of each of said sets of pictures of the first and second programs being respectively moved by transport packet streams, each transport packet stream being fitted with a PUSI indicator which, when set at 1, denotes that said packet contains the beginning of a packetized elementary stream (PES) packet containing a single picture and beginning with a video access unit and certain transport packets being intended to carry a random access transport indicator RAI which, when set at 1, denotes that the next transport packet contains the first data of a sequence (and of a group of pictures);

determining the first transport packet TP of the second-program video component which is present after the switch command in the transport stream which includes a random access indicator RAI set at 1 for the purpose of determining the beginning of the first set of pictures of the second program onto which the switching is applied;

set at 1 the discontinuity indicator in the adaptation field AF of this transport packet TP;

beginning with this transport packet TP with random access indicator RAI, including this packet, moving into position on the first B picture of this first set of pictures of the second program;

beginning with this transport packet TP corresponding to a beginning of a bidirectional picture B, this packet included, moving past the header of the PES packet and replacing the payload data of each transport packet of the video component with the data of the replacement picture;

once all data of the replacement picture have been inserted, replacing the payload data of the component's transport packets TP with video stuffing until the next transport packet TP of this second-program video component of which the PUSI indicator is set at 1, this transport packet TP being excluded; and thereupon, if the number of bidirectional pictures preceding the first predicted picture is larger than 1, repeating the two preceding stages for the ensuing bidirectional pictures B, starting from the next transport packet TP of which the PUSI indicator is set at 1.

9. A method of switching video component(s) of a first digital audio-visual program onto video component(s) of a second digital audio-visual program, each video component including in the order of presentation of a sequence of ordered sets of pictures which are Intra or predictive or bidirectional, each Intra picture being devoid of reference to any other picture, each predictive picture referring to the Intra picture or to the predictive picture preceding it, each bidirectional picture being referable to two Intra or predictive pictures, namely the Intra picture or the following predictive picture or to a combination of two preceding and following predictive pictures or Intra pictures, the method comprising:

performing switching at the beginning of the first set of pictures including an Intra picture of the second-program video component encountered following the switch command and in the transmission order of the pictures, replacing each of the bidirectional pictures of this first set of pictures referring to pictures belonging to the set of pictures which preceded it with a bidirectional picture, performing video coding independently of the contents of the replaced picture and of at least one of the contents of the pictures to which it refers, said bidirectional pictures including motion-estimating vectors, and further comprising setting to a zero value said motion-estimating vectors of the replacement picture, or each one, said replacement picture(s) referring uniquely to the Intra picture of the first set of pictures of the second-program video component encountered following the switch command, said pictures of each of said sets of pictures including the video components of the first and second programs being carried by transport packet streams, each transport packet being fitted with a PUSI indicator which, when set at 1, denotes that said packet contains the beginning of a packetized elementary stream (PES) packet containing a single picture but where the second stream is devoid of a random access indicator RAI;

determining the first transport packet TP of the second-program video component which is present following the switch command in the transport stream which comprises a PUSI indicator set at 1 and of which the payload data begin with a video sequence header, where called for followed by a header of a group of pictures GOP;

searching the sequence header either, if it is present, directly following the header of the PES packet or, if the video component is scrambled, by actuating an unscrambler;

if the determined transport packet TP comprises an adaptation field AF with a program clock reference PCR in the event the component carries the program clock, setting the discontinuity index in this transport packet TP;

starting with this inserted transport packet TP (included), moving in place on the first bidirectional B picture of this first set of the second-program set of pictures;

starting from this transport packet TP corresponding to a beginning B picture (included), moving past the PES packet header or replacing this PES packet header situated at the beginning of the payload with a reconstituted PES packet header and then replacing the payload data of each transport packet TP of the video component with the data of the replacement B bidirectional picture, and in the case of scrambled transport packets TP, denoting them in clear by setting the transport scrambling control TSC at the binary value 00;

after all the data of the replacement picture have been inserted, replacing the payload data of the ensuing component transport packets TP with video stuffing while continuing to denote them in clear until the next transport packet TP of this second-program video component of which the PUSI indicator is set at 1 (this transport packet being excluded);

thereupon, if the number of B pictures preceding the first P picture is larger than unity, repeating the two preceding stages for the ensuing P pictures, by starting with the next transport packet TP of which the PUSI indicator is set at 1.

10. The method of claim 9, wherein the inserted transport packet TP includes the following characteristics:

the PUSI indicator is set at 0, the status of the continuity counter is set to that of the continuity counter of the preceding transport packet TP of the video component, the adaptation field control AFC is set to the binary value 11 indicating that an adaptation field AF and a payload are present in this transport packet TP, the discontinuity indicator situated in the AF is set at 1, and if the video component carries the program clock, setting in the AF a program clock reference PCR calculated on the basis of the preceding PCR(s) of the same component.

11. The method of claim 9, wherein preprocessing is carried out to allow setting the RAIs, and the inserted transport packet TP includes the following characteristics:

the PUSI indicator is set at 1, the status of the discontinuity counter is set at that of the discontinuity counter of the preceding transport packet TP of the video component, the adaptation field control AFC is set at the binary value 11 denoting that an adaptation field AF and a payload are present in this transport packet TP, the random access indicator RAI situated in its adaptation field AF is set at 1, if the video component carries the program clock, setting in the adaptation field AF a program clock reference PCR calculated on the basis of the preceding PCR of the same component, and displacing the PES packet header which was situated in the replaced transport packet TP into the payload of this inserted transport packet TP and in case a presentation time stamp PTS is absent from the PES packet header, this PTS being calculated and set in the header data of this PES packet.

12. The method of claim 9, wherein the reconstructed PES packet header includes a: start code=0x000001, 0x000001, stream ID=that of the first program, PES packet length= 0x0000, flag octet=0x8500, length of header date=0x00: PES packet in clear, absence of PTS/DTS, no other data of PES packet header.

13. The method of claim 9, wherein in case the determined transport packet TP is free of an adaptation field AF or if the component carrying the program clock is involved and the adaptation field AF lacks any program clock reference PCR, the determined transport packet TP is replaced by a transport packet TP carrying a program clock reference PCR, and shifting (a) the replaced transport packet and (b) the following transport packets TP of this video component in the transport stream until one of them can be inserted into a stuffing transport packet TP.

* * * * *